US008504918B2

(12) United States Patent
Davidson et al.

(10) Patent No.: US 8,504,918 B2
(45) Date of Patent: Aug. 6, 2013

(54) IDENTIFICATION OF VIDEO SEGMENTS

(75) Inventors: Michael Davidson, Seattle, WA (US);
Oliver A. Locke, Carnation, WA (US);
Anthony L. Baker, Redmond, WA (US)

(73) Assignee: NBCUniversal Media, LLC, New York, NY (US)

( * ) Notice: Subject to any disclaimer, the term of this patent is extended or adjusted under 35 U.S.C. 154(b) by 141 days.

(21) Appl. No.: 12/705,999

(22) Filed: Feb. 16, 2010

(65) Prior Publication Data
US 2011/0202844 A1    Aug. 18, 2011

(51) Int. Cl.
*G06F 3/00*    (2006.01)

(52) U.S. Cl.
USPC .......................................... 715/721

(58) Field of Classification Search
USPC ................. 715/721, 723, 751, 760
See application file for complete search history.

(56) References Cited

U.S. PATENT DOCUMENTS

| 5,929,849 | A | 7/1999 | Kikinis |
| 6,636,238 | B1 * | 10/2003 | Amir et al. .................... 715/730 |
| 7,260,564 | B1 | 8/2007 | Lynn et al. |
| 7,280,738 | B2 | 10/2007 | Kauffman et al. |
| 2003/0001846 | A1 | 1/2003 | Davis et al. |
| 2008/0148336 | A1 * | 6/2008 | Walter et al. .................... 725/137 |
| 2008/0294694 | A1 * | 11/2008 | Maghfourian et al. .... 707/104.1 |
| 2009/0070837 | A1 | 3/2009 | Jacobs |
| 2010/0180218 | A1 * | 7/2010 | Boston et al. .................. 715/759 |

FOREIGN PATENT DOCUMENTS
WO    0145313 A2    6/2001

OTHER PUBLICATIONS

Liberty, Jesse, "Hyper-Video", Retrieved at <<http://silverlight.net/learn/tutorials/hypervideo-cs/>> Apr. 7, 2009, 18 pages.

* cited by examiner

Primary Examiner — Thanh Vu
(74) Attorney, Agent, or Firm — Fletcher Yoder, P.C.

(57) ABSTRACT

Video content, such as broadcast television, may be divided into segments, and each segment may be assigned a distinguishing Uniform Resource Locator (URL). The URL assigned to a segment allows a user to access the segment via the Internet. For example, a television news program may be broken into segments (e.g., each interview on the program might constitute a segment). For each segment, a code may be assigned, and may be appended to the broadcaster's domain name to create a distinct URL for the segment. While the segment is being broadcast, the URL may be displayed with the segment, thereby allowing a viewer to identify the segment and to locate an Internet version of the segment. Entering the URL into a browser may access an Internet version of the broadcast segment to which the URL pertains.

20 Claims, 5 Drawing Sheets

IDENTIFICATION OF VIDEO SEGMENTS

BACKGROUND

Broadcast video increasingly has become available over the Internet. Many video program providers, such as over-the-air broadcasters or cable television stations make some or all of their broadcast video available on their web sites. For example, segments of news programs may be available on the web sites of news providers such as MSNBC.

When broadcast video is made available on web sites, one issue that arises is how to identify the Internet version of a particular broadcast video. If a viewer sees, for example, an interview on a broadcast news programs and wants to watch that interview on the Internet, the viewer can try to find the interview through a search. For example, if the video is an interview with a famous person, the views can use a search engine to search on that person's name. However, this open-ended approach may or may not result in finding the right video.

SUMMARY

A segment of video that is broadcast on television may be associated with a distinct Uniform Resource Locator (URL). The URL may be shown along with the video—e.g., the URL may be superimposed on the video while the video is being broadcast. When the URL is shown with a segment of video, that URL can be unambiguously associated with the segment. This association between the URL and a particular video segment allows a viewer to find the video segment on the Internet quickly, and also simplifies the process of referring others to watch the video segment. For example, when a particular news interview plays on television, the URL "example.tv/39f02" might be displayed across the bottom of the screen. If a user enters that URL into a browser, the user might be taken to a video player that plays the same segment. The user might want to suggest that another person watch the segment. The user can easily identify the segment to be watched by communicating the URL to that other person.

The URL may be assigned in various ways. In one example, the television provider owns a domain name (e.g., "example.tv"), and appends a code to that domain name (e.g., "example.tv/39f02") in order to create the URL for a segment. The code may be chosen sequentially, at random, based on a hash of some material related to the segment, using a mnemonic (e.g., a number prefixed by a short form of the television program's title), or by any other technique.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
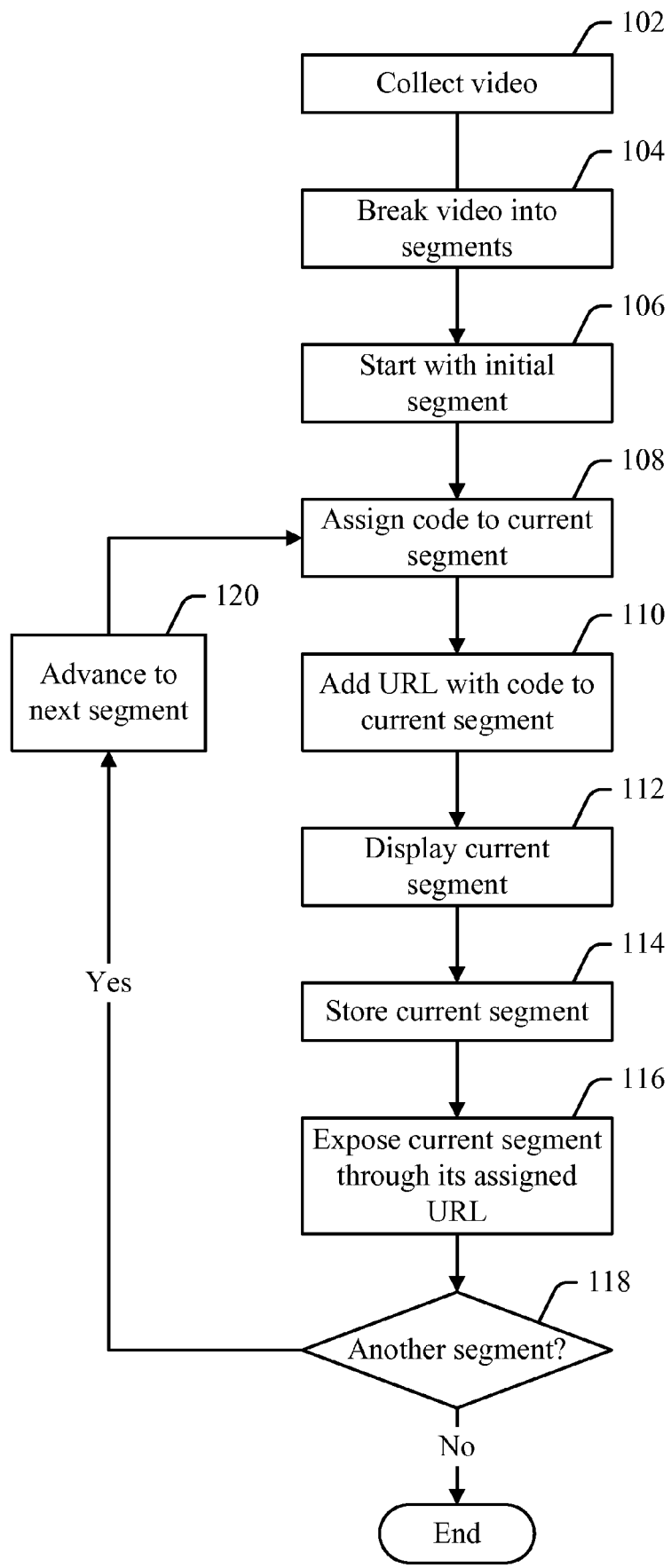
FIG. 1 is a flow diagram of an example process in which video segments may be associated with URLs.

Video that has been broadcast on over-the-air television, or on cable television, is often available for viewing on the Internet. For example, a television provider (e.g., MSNBC) may broadcast a television show, and may make the show (or a portion of the show) available for viewing on its web site. Typically, the show is broken into segments, and specific segments of the show are made available as discrete units of video. For example, a half-hour news program might contain three separate interviews. An editor might break the program into segments, where, in this example, each interview would be a segment. Each segment then might be offered on the news provider's web site as a separate video.

One issue that arises is how a user identifies the video that he wants to see. Typically, the editor who breaks the program into video segments puts appropriate metadata with each segment, thereby allowing a user to search for a video. If the program "Countdown with Keith Olbermann" contains an interview with Hillary Clinton, the editor could include Hillary Clinton's name in the metadata for the segment that contains that interview. Therefore, a user may be able to find the video by searching on the term "Hillary Clinton." However, this open-ended approach to finding a video often makes it difficult for a person to locate the Internet version of what he has seen on television. For example, a viewer might be watching an interview on television and might want to suggest that a friend watch the same segment on the Internet. The viewer could attempt to describe the segment to the friend in order to facilitate an appropriate search. (E.g., the viewer might say to his friend, "Search on the terms 'Keith Olberman' and 'Hillary Clinton' to see if you can find the interview.) But a more systematic approach could make videos easier to find.

The subject matter described herein provides a way to identify segments of video. A program that is broadcast is broken into segments. ("Broadcast", as used herein, is not limited to over-the-air television broadcasts, but also includes some television content delivered by cable, satellite, fiber, etc.) The dividing of the program into segments could be done in any appropriate manner. For example, a human editor could identify the boundaries between segments. Or, as another example, a computer program could algorithmically detect the segment boundaries by looking for changes in the audio or visual features of the program. Regardless of the manner in which the program is divided into segments, once the segments have been identified a distinguishing Uniform Resource Locator (URL) may be assigned to the segment. One way to create the URL is to assign a code to each segment, and to append the code to a domain name associated with the provider of the television program. For example, a program provider might own the domain name "example.tv". Each segment could be assigned a short code (e.g., "39f02"), which could be appended to the provider's domain name, as in the string "example.tv/39f02". This URL could be shown with the segment to which it applies. For example, the URL could be superimposed over the video segment associated with the URL as the program is being broadcast, thereby allowing the user to associate the segment he is watching with that segment's URL. If a user enters the URL into the navigation bar of a browser, the user could be taken to the same segment of video. The code for the URL can be chosen in various ways. For example, a pseudo-randomly generated alphanumeric string could be assigned to each segment, or the codes could be assigned sequentially, or the codes could be assigned in some way that incorporates the name of the program to which it relates (e.g., "cd0001" for a segment from "Countdown with Keith Olbermann", with the "cd" in the code standing for "Countdown").

Turning now to the drawings, FIG. 1 shows an example process in which video segments may be associated with URLs. Before turning to a description of FIG. 1, it is noted that the flow diagram of FIG. 1 shows an example in which stages of a process are carried out in a particular order, as indicated by the lines connecting the blocks, but the various stages shown in this diagram may be performed in any order, or in any combination or sub-combination.

At 102, video is collected. The video that is collected is the video that is to be broken into segments and to which distinguishing URLs are to be assigned—e.g., the video might be a news program where each interview in the news program will be treated as a separate segment. The video may be collected in any manner appropriate to the circumstances. For example, if the video to which the URLs are to be assigned is a live video broadcast, then collection of the video may involve recording the live broadcast and indexing the recorded material in some manner concurrently with the capture of that material. As another example, the video to which the URLs are to be applied might be pre-recorded material that is to be broadcast at some point in time, in which case collecting the video may simply involve obtaining the existing recording of the video.

When the video has been collected, the video may be broken into segments (at 104). In the case of a live broadcast, the breaking of video into segments may occur concurrently with the collection of the video. Any appropriate technique may be used to break the video into segments. For example, a human editor may examine the video and decide where segments begin and end. Or, as another example, algorithmic analysis of the audio and/or visual material may be performed to determine where segments begin and end. For example, suppose that a news program contains an interview between a reporter and a subject. During the interview, the features of the audio and video content may tend to fall inside a narrow band—e.g., the same set of voices will be present throughout the interview, and the camera angle might be the same. An abrupt change in the audio and/or video content might be interpreted as a signal that the interview has ended and that some other segment of the program has begun. Thus, an analyzer may identify segment boundaries based on these types of changes. The foregoing are some examples, although the boundaries between segments could be identified in any appropriate manner.

Each of the segments may be assigned a URL as described in connection with blocks 106-120. It is noted that the actions described in connection with blocks 106-120 may be performed after all of segments have been created (i.e., after all segment boundaries have been identified), or may be performed concurrently with the creation of segments. For example, when the segments are part of a live broadcast, the assignment of codes to segments may happen concurrently with the breaking of the live broadcast into segments.

At 106, an initial segment is identified. The actions shown in blocks 108-116 may be repeated once for each segment, and the segment that those blocks are currently operated on is referred to in the blocks as the "current segment." Thus, at 106, one segment is identified as being the current segment.

Figure 4:
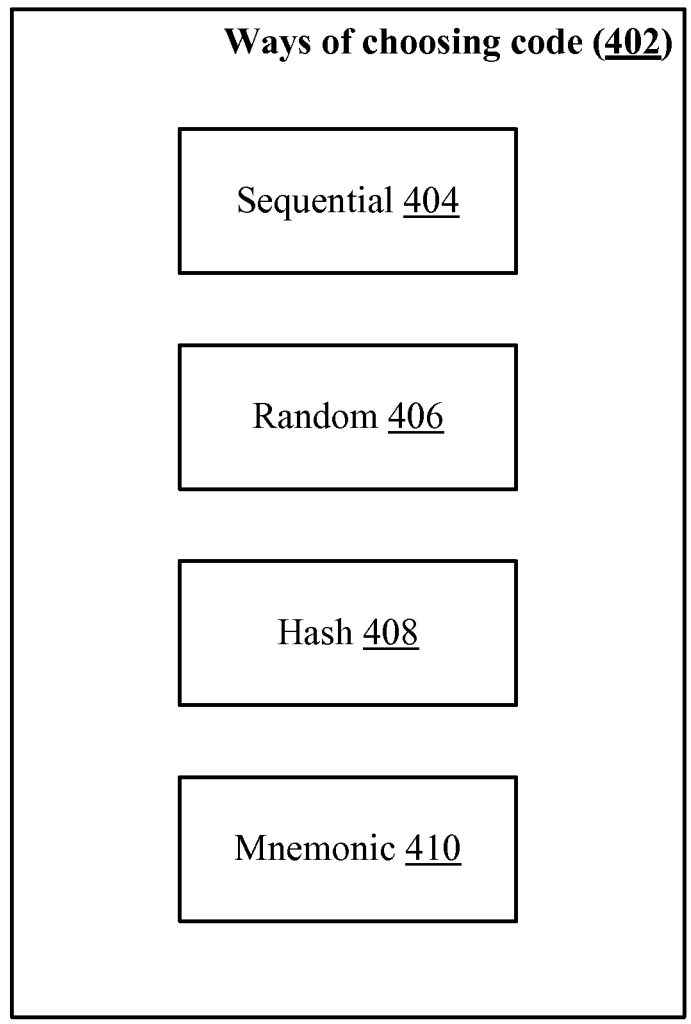
FIG. 4 is a block diagram of some example ways in which codes may be chosen.

At 108, a code is assigned to the current segment. The code may be assigned in any manner. FIG. 4 shows some example ways 402 of choosing a code. For example, segments may be numbered sequentially (block 404), so that successive segments might be numbered "00001", "00002", "00003", etc. As another example, the segment code might be chosen at random by a pseudo-random number generator (block 406), or using a hash of some portion of the segment (block 408) to create a code that appears to be random. With pseudo-random codes or hash-generated codes, the codes assigned to successive segments might be seemingly unrelated alpha-numeric strings like "39f02", "4713c", "7b206", etc. As another example, segments might be numbered in some way that acts as a mnemonic for the material to which the numbers pertain (block 410). For example, segments from "Countdown with Keith Olbermann" might be assigned codes that contain a string of letters derived from the title of the program—e.g., the initials "cd" for "Countdown", yielding a code such as "cd-00001". The various ways of assigning codes might be appropriate in different circumstances. For example, assigning sequential codes provides simplicity, but makes it easy for hacker who is looking for videos to download to find valid codes simply by trying all successive codes. If a code is chosen at random or using a hash, it would be more difficult for a hacker to guess a valid code, but the codes would be more difficult to generate or to remember. Using some sort of mnemonic device (e.g., prefixing "cd" to the codes associated with segments of "Countdown") might help a user to remember the code.

Returning to FIG. 1, at 110 a distinct URL containing the code is added to the current segment. For example, a particular video provider might use the domain name "example.tv". Thus, if a segment has been assigned the code "39f02", then the URL "example.tv/39f02" could be added to that segment. In one example, a domain name is used that is common to all of the segments, and the URLs are made distinct by combining the common domain name with a distinct URL. For example, all of the segments that are processed at 108-120 may be assigned a URL that contains the domain name "example.tv", but the URLs may be made distinct by appending distinct codes (e.g., 39f02, 47130, etc.) to the common domain name. Appending the code to the end of a domain name is merely one way to create a URL. In another example, the code could be added to the domain in a different manner (e.g., "39f02.example.tv"). Once the URL has been created in some manner, it is added to the segment. In one example, the URL is added to the segment by superimposing the URL over the video—e.g., the URL "example.tv/39f02" might be added to the bottom of viewing frame in the segment to which that URL pertains.

It is noted that the URL (and the code that may be contained in the URL) may be "distinct" or "distinguishing" in the sense that a given URL (or its code) distinguishes one segment from another. For example, if a segment is assigned the URL "example.tv/39f02", then this URL refers to one particular segment, and not to other segments.

At 112, the current segment, with the added URL, is displayed. One example of how the segment may be displayed is to broadcast the segment on television whereupon it would be shown on a computer screen. However the segment could be displayed in other ways—e.g., playing the segment via the Internet using a video player, playing the segment on a closed circuit television system such as an airline entertainment system, etc.

At 114, the segment is stored. For example, the segment may be stored in database 312 (shown in FIG. 3, and described below). In one example, the various components of broadcast material (e.g., the video, the audio, the captions, etc.) may be stored in a database and may be indexed by timecodes, thereby allowing these different components to be connected. Thus, in one example implementation, a segment of video is associated with a URL by associating the URL with the starting and ending timecodes for the segment. At 116, the segment may be exposed so as to be accessible through its URL. For example, the segment may be exposed through the Internet, so that entering the segment's assigned URL into the navigation bar of an Internet-connected browser will access the segment in its stored location, and will cause the segment to be delivered and played through the Internet.

At 118, it is determined whether there is another segment to which to assign a URL. If so, then the process continues to 120 to advance to the next segment (where the next segment then becomes the "current segment" for purposes of the flow diagram), and then returns to 108 to assign a code to that next segment. On the other hand, if it is determined at 118 that there are no more segments to consider, then the process ends.

Figure 2:
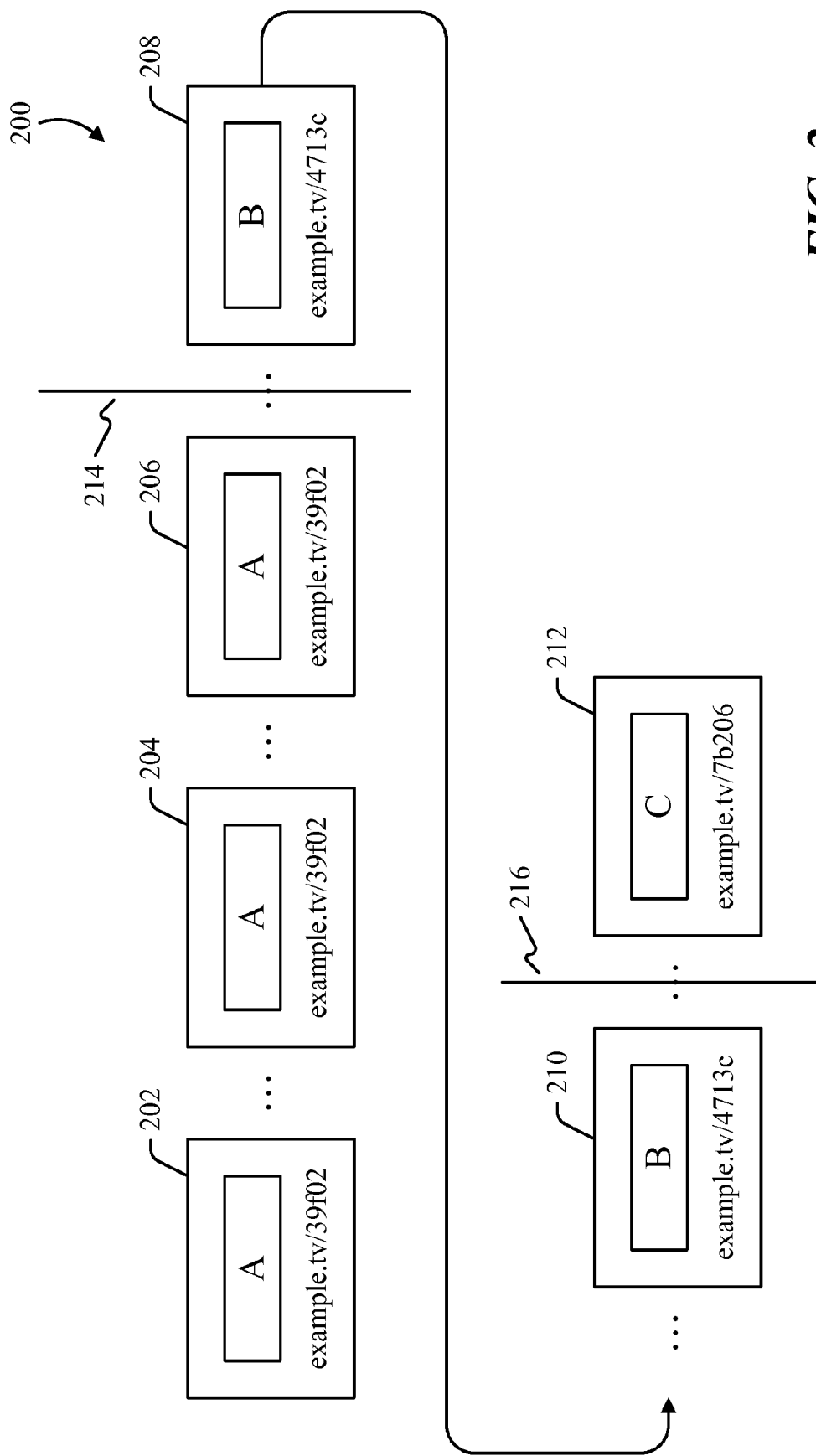
FIG. 2 is a block diagram of example segments of video to which distinguishing URLs have been assigned.

FIG. 2 shows example segments of video to which distinguishing URLs have been assigned. In FIG. 2, boxes 202, 204, 206, 208, 210, and 212 represent periodic snapshots of a video 200 that has been divided into segments. For example, each box might represent the video as it appears at ten-second intervals. In the example shown, video 200 has been divided into three segments, marked "A", "B", and "C". The boundary between segments "A" and "B" is boundary 214, and the boundary between segments "B" and "C" is boundary 216. For in a news program, segments "A" and "C" might be two different interviews, and segment "B" might be a transitional segment in which the anchor offers closing notes on the first interview and introduces the second interview. As noted above, the boundaries between these segments could be detected in any manner—e.g., by a human editor, or by algorithmic analysis of the audio/visual material.

As can be seen in FIG. 2, segment "A" is marked with the URL "example.tv/39f02". Box 202 represents what one would see at a particular instant in time if one were watching the video—e.g., in the case of box 202, one would see the letter "A", with the banner "example.tv/39f02" across the bottom of the screen. Thus, segment "A" has been assigned the URL "example.tv/39f02", and this URL is displayed as part of the video for as long as segment "A" is playing. As noted above, the URL might be chosen by using a domain name that is owned by the video provider and appending a code that is assigned to the segment, although the URL could be chosen in any appropriate manner.

As can also be seen in FIG. 2, segments "B" and "C" are also associated with their own distinguishing URLs. Segment "B" is associated with URL "example.tv/4713c", and segment "C" is associated with URL "example.tv/7b206". These URLs are also displayed across the screen while the segments are playing. In this way, if a viewer is watching one of the segments and wants to know how to access that segment on the Internet, he or she can simply read the URL off the screen and can enter the URL into the navigation bar of a browser.

Figure 3:
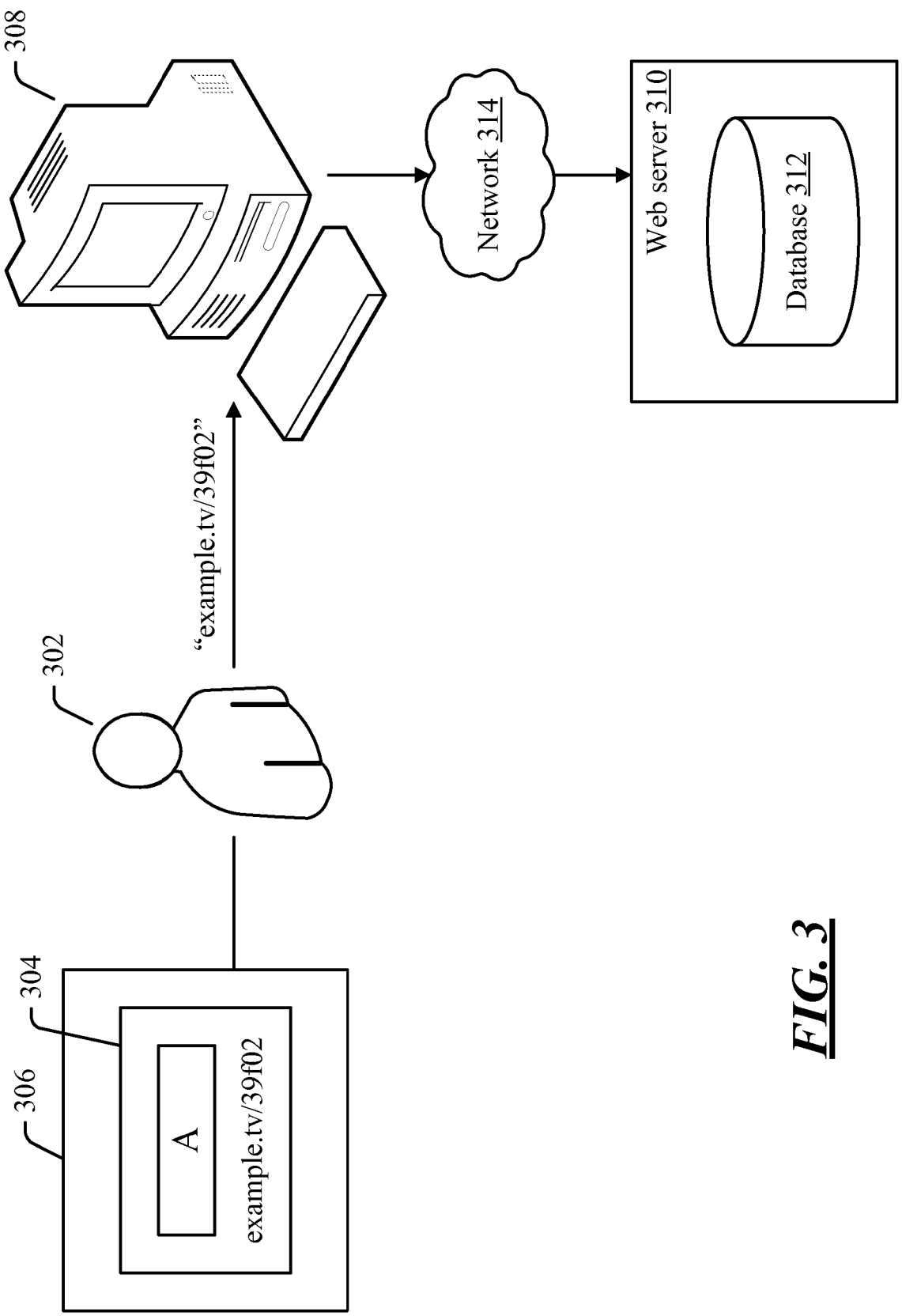
FIG. 3 is a block diagram of an example of how the URLs that are associated with segments may be used.

FIG. 3 shows an example of how the URLs that are associated with segments may be used. In the example of FIG. 3, a user 302 watches a segment 304 of a video on television 306. The segment 304 that user 302 is watching is segment "A", discussed above in connection with FIG. 2. Segment "A" is associated with the URL "example.tv/39f02". That URL appears on the screen while user 302 is watching segment 304.

If user 302 wants to watch segment "A" on the Internet, user 302 may enter the URL "example.tv/39f02" into his or her computer 308. For example, a web browser may be running on computer 308, and user 302 may enter the URL into the navigation bar of the web browser in order to request the segment associated with that URL. The URL may point to a web version of segment "A" (which may, for example, be stored in database 312, which is made accessible over network 314 through web server 310). For example, navigating to the URL "example.tv/39f02" may cause the web server to respond to the request by playing segment "A" in a video player widget on the browser. The segment may be played in various ways. For example, database may store a separate video file for each segment, and this file could be played in response to requesting the segment's URL. As another example, there could be a large file that stores plural segments of video (e.g., an entire program), where the time boundaries of each segment are known. In that case, requesting the URL for a segment could play the portion of the large video file that runs from the beginning to the end of the requested segment.

The URL may be used in other ways. For example, user 302 might see segment "A" on television and might want to recommend the segment to another person. User 302 could then communicate the URL to that other person (e.g., by e-mail, telephone, fax, physical mail, etc.). By providing the URL, user 302 not only identifies the segment in question to the other person, but also provides that person with a reliable way to access the segment. Additionally, the URL can be monetized in various ways. For example, it make take some amount of time to encode the video for web playback. If a user requests the URL for a segment and the web video of that segment is not ready, the user could be shown ads while waiting for the segment. Since the user has requested to see a segment about a particular topic, information about what topic the user has requested could be used to target the ads. Moreover, the URLs could in some way identify the television provider (e.g., the cable or satellite company) on which the user saw the original television program, and this information could be used to serve the cable or satellite company's specific ads—e.g., different users might see different URLs for the same segment of a television program, depending on which cable or satellite provider they are watching the program on.

Figure 5:
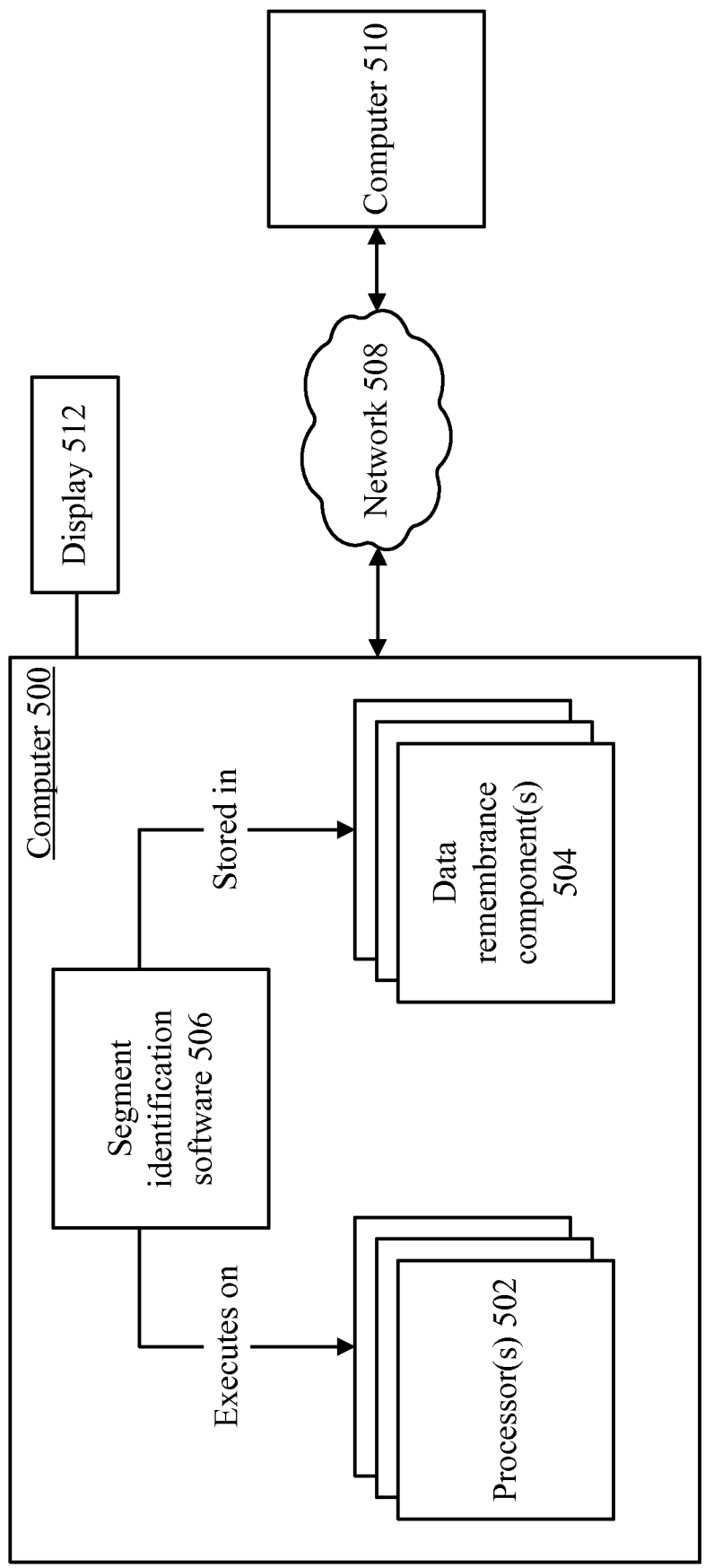
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is segment identification software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more non-transitory computer-readable media that store executable instructions to assign a Uniform Resource Locator (URL) to portions of a broadcast video, wherein the instructions, when executed by a computer, cause the computer to perform first acts comprising:
collecting said video;
automatically analyzing said video to identify a plurality of segments of said video;
for each segment in the identified plurality of segments of said video, performing second acts comprising:
assigning a distinct URL to the segment; and
adding the distinct URL to the segment;
broadcasting, via a first media source, said plurality of segments of said video, wherein each of the segments is displayed with its distinct URL;
storing each of the segments; and
exposing, via a second media source, each of the stored segments through its distinct URL; wherein the first media source is different from the second media source and the second media source comprises an Internet website.

2. The one or more non-transitory computer-readable media of claim 1, wherein the distinct URL for a given segment comprises:
a domain name that common to all of the plurality of segments; and
a code that is distinct to each segment.

3. The one or more non-transitory computer-readable media of claim 2, wherein said first acts further comprise:
choosing said code sequentially.

4. The one or more non-transitory computer-readable media of claim 2, wherein said first acts further comprise:
choosing said code pseudo-randomly.

5. The one or more non-transitory computer-readable media of claim 2, wherein said first acts further comprise:
choosing said code as a hash of the segment to which said code applies.

6. The one or more non-transitory computer-readable media of claim 2, wherein said first acts further comprise:
including, in said code, initials of a title of said video.

7. The one or more non-transitory computer-readable media of claim 1, wherein automatically analyzing said video comprises:
identifying boundaries in said video; and
breaking said video into said plurality of segments using said boundaries.

8. The one or more non-transitory computer-readable media of claim 1, wherein said video comprises a live broadcast, wherein the first media source comprises an over-the-air feed, a cable feed, or both, and wherein said assigning and said adding of the distinct URLs is performed contemporaneously with live capture of the video.

9. A method of providing a video, the method comprising:
using a processor to perform first acts comprising:
collecting the video;
automatically analyzing the video to identify a plurality of segments of the video;
for each segment in the identified plurality of segments, performing second acts comprising:
assigning a Uniform Resource Locator (URL) to the segment, wherein the URL comprises a code that is distinct to the segment and a domain name that is common to all of the plurality of segments;
adding said URL to the segment;
broadcasting, via a first media source, the segment with the segment's assigned URL being displayed;
storing the segment in a database; and
exposing, via a second media source, the stored segment through the segment's URL;
receiving a request that comprises a first one of the URLs assigned to the plurality of segments; and
in response to the request, providing, via the second media source, the segment to which the first one of the URLs is assigned; wherein the first media source is different from the second media source and the second media source comprises an Internet website.

10. The method of claim 9, wherein the video comprises a live broadcast, and wherein the assigning of a URL to a segment is performed contemporaneously with live capture of the segment.

11. The method of claim 9, wherein said second acts further comprise:
choosing said code pseudo-randomly.

12. The method of claim 9, wherein said second acts further comprise:
choosing said code as a hash of the segment to which the code applies.

13. The method of claim 9, wherein said video is stored in said database with timecodes, and wherein assigning a URL to each segment comprises associating said URL with the timecodes associated with the segment.

14. A system for providing a video, the system comprising:
a processor;
a data remembrance component;
a database configured to store segments of the video for retrieval via the Internet;
a segment identification component that is stored in said data remembrance component and that executes on said processor, said segment identification component automatically analyzing the video to identify a plurality of segments of the video, choosing a distinct code for each of the identified plurality of segments of the video and assigning, to each of the plurality of segments, a Uniform Resource Locator (URL) that comprises a domain name that is common to all of the segments and the distinct code for each segment, wherein said segment identification component adds each segment's URL to the segment, displays, via a first media source, the segment with the segment's URL, and causes the segment to be stored in said database for retrieval via a second media source; wherein the first media source is different from the second media source and the second media source comprises an Internet website referred to by the URL.

15. The system of claim 14, wherein said segment identification component chooses the code for each segment sequentially.

16. The system of claim 14, wherein said segment identification component chooses the code for each segment pseudo-randomly.

17. The system of claim 14, wherein said segment identification component chooses the code for each segment as a hash of the segment to which the code applies.

18. The system of claim 14, wherein said segment identification component chooses the code for each segment to include a string of letters derived from a title of the video.

19. The system of claim 14, wherein said database received a request for a segment of video that comprises one of the URLs assigned to the segments, and wherein the database provides the segment of video associated with the URL in the request.

20. The system of claim 14, wherein said video comprises a live broadcast, and wherein said segment identification component assigns a URL to a given segment, and displays the URL with the given segment, contemporaneously with live capture of the given segment.

* * * * *